United States Patent Office 3,711,403
Patented Jan. 16, 1973

3,711,403
CORROSION INHIBITORS EMPLOYING PHOSPHATE ESTERS OF CYCLIC AMIDINES
Derek Redmore, Ballwin, Mo., assignor to Petrolite Corporation, Wilmington, Del.
No Drawing. Original application Sept. 11, 1967, Ser. No. 666,953. Divided and this application Jan. 18, 1971, Ser. No. 107,450
Int. Cl. C07d 49/34; C23f 11/16
U.S. Cl. 252—8.55 E        5 Claims

ABSTRACT OF THE DISCLOSURE

Esters of cyclic amidines and phosphoric acids, including oxygen, sulfur and oxygen and sulfur-containing phosphoric acids, as illustrated by esters of the formula

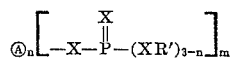

where Ⓐ is a cyclic amidine-containing radical, for example imidazoline and tetrahydropyrimidine, X is oxygen and/or sulfur; R' (which may be the same or different) is hydrogen or an alcohol moiety; $n$ is 1–3, and $m$ is a number determined by the number of hydroxy groups on the cyclic amidine. These compounds, among other uses, are employed as corrosion inhibitors.

---

This application is a division of S.N. 666,953, filed Sept. 11, 1967, now U.S. Pat. No. 3,585,210, patented on June 15, 1971.

This invention relates to esters of cyclic amidines and phosphoric acids. More particularly this invention relates to esters of the formula

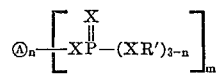

where Ⓐ is a cyclic amidine-containing radical, for example imidazoline and tetrahydropyrimidine; X is oxygen or sulfur; R' is hydrogen or an alcohol moiety; $n=1-3$; and $m$ is a number determined by the number of hydroxy groups on the cyclic amidine. (The R's can all be the same or different.) This invention also relates to uses for these esters, including their uses as corrosion inhibitors.

More specifically, in the above formula Ⓐ contains either a imidazoline or tetrahydropyrimidine radical, for example, the following radicals (1)

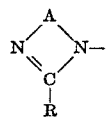

2)

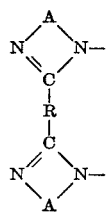

in which

and

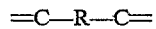

are the residual radicals derived from the carboxylic acids:

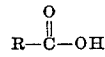

or

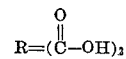

where R comprises, for example, a saturated or unsaturated aliphatic radical, a cycloaliphatic radical, an aryl radical, an aralkyl radical, an alkaryl radical, n alkoxy alkyl radical, an aryloxy-alkyl radical, and the like; and A is an alkylene group; for erample, ethylene and propylene radicals, such as $$-CH_2-CH_2-$$
$$-CH_2CH_2CH_2-$$
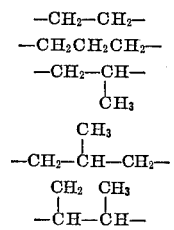

In general, the cyclic amidine, phosphate esters are prepared by reacting phosphorylating reagents such as phosphoric acid and thiophosphoric acids and derivatives of these such as anhydrides, partial anhydrides and halides, with the desired molar ratio of hydroxy containing cyclic amidines for example of the formula $$Ⓐ—(A—O)_n—H$$

More specifically, the corrosion inhibiting aspect of this invention relates to a method for inhibiting corrosion of ferrous metals by hydrocarbon fluids containing water and corrosive materials such as $H_2S$, $CO_2$, inorganic acids, organic acids, etc., combinations of these materials with each other, combinations of each of said corrosive materials with oxygen, and combinations of said materials with each other and oxygen, which comprises adding to said fluids at least five parts per million of the above cyclic amidine esters, said compounds being sufficiently soluble in the hydrocarbon fluid to inhibit corrosion.

THE HYDROXY CYCLIC AMIDINE

The expression "cyclic amidines" is employed in its usual sense to indicate ring compounds in which there are usually present either five members or six members, and having two nitrogen atoms separated by a single carbon atom supplemented by either two additional carbon atoms or three additional carbon atoms completing the ring. All the carbon atoms may be substituted. In the present instance, the nitrogen atom of the ring involving two monovalent linkages (i.e. at the one-position) is substituted with a hydroxy-containing group for example as represented by

where A is alkylene, $n$ is a number for example 1–10 or higher, but preferably 1–3.

The hydroxy cyclic amidine is thus represented by the formula:

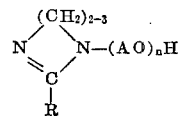

These cyclic amidines are further characterized as being substituted imidazolines and tetrahydropyrimidines in which the two-position carbon of the ring is generally bonded to a hydrocarbon radical or comparable radical derived from an acid, such as a low molal fatty acid, a high molal fatty acid, or comparable acids, polycarboxy acids, and the like.

For details of the preparation of imidazolines substituted in the 2-position from amines, see the following U.S. patents, U.S. No. 1,999,989, dated Apr. 30, 1935, Max Bockmuhl et al.; U.S. No. 2,155,877, dated Apr. 25, 1939, Edmund Waldmann et al.; and U.S. No. 2,155,878, dated Apr. 25, 1939, Edmund Waldmann et al. Also see Chem. Rev. 32, 47 (1943), and Chem. Rev. 54, 593 (1954).

Equally suitable for use in preparing compounds of my invention and for the preparation of tetrahydropyrimidines substituted in the 2-position are the polyamines containing at least one primary amino group and at least one secondary amino group, separated from the first primary amino group by three carbon atoms instead of being separated by only 2 carbons as with imidazolines. This reaction, as in the case of the imidazolines, is generally carried out by heating the reactants to a temperature at which 2 mols of water are evolved and ring closure is effected. For details of the preparation of tetrahydropyrimidines, see German Pat. No. 700,371, dated Dec. 18, 1940, to Edmund Waldmann and August Chwala; German Pat. No. 701,322 dated Jan. 14, 1941, to Karl Kiescher, Ernst Urech and Willi Klarer, and U.S. Pat. No. 2,194,419, dated Mar. 19, 1940, to August Chwala.

Substituted imidazolines and tetrahydropyrimidines are obtained from a variety of acids beginning with the one-carbon acid (formic) through and including higher fatty acids or the equivalent having as many as 32 carbon atoms. Modified fatty acids also can be employed as, for example, phenyl stearic acid or the like. Cyclic acids may be employed, including naphthenic acids. A variety of other acids including benzoic acid, substituted benzoic acid, salicylic acid, and the like, have been employed to furnish the residue

from the acid RCOOH in which the C of the residue

is part of the ring. The fatty acids employed, for example, may be saturated or unsaturated. Branched long chain fatty acids may be employed. See J. Am. Chem. Soc. 74, 2523 (1952). This applies also to the lower molecular weight acids as well.

Among sources of such acids may be mentioned straight chain and branched chain, saturated and unsaturated, aliphatic, cycloaliphatic, aromatic, hydroaromatic, aralkyl acids, etc.

Examples of saturated aliphatic monocarboxylic acids, comprise: acetic, propionic, butyric, valeric, caproic, heptanoic, caprylic, nonanoic, capric, undecanoic, lauric, tridecanoic, myriatic, pentadecanoic, palmitic, heptadecanoic, stearic, nonadecanoic, eicosanoic, heneicosanoic, docosanoic, tricosanoic, tetracosanoic, pentacosanoic, cerotic, heptaconsanoic, montanic, nonacosanoic, melissic and the like.

Examples of ethylenic unsaturated aliphatic acids comprise: angelic, tiglic, the pentenoic acids, the hexenoic acids, for example, hydrosorbic acid, the heptenoic acids, the octenoic acids, the nonenoic acids, the decenoic acids, for example, obtusilic acid, the undecenoic acids, the dodecenoic acids, for example, lauroleic, linderic, etc., the tridecenoic acids, the tetradecenoic acids, for example, myristoleic acid, the pentadecenoic acids, the hexadecenoic acids, for example, palmitoleic acid, the heptadecenoic acids, the octodecenoic acids, for example, petrosilenic acid, oleic acid, elardic acid, the nonadecenoic acids, for example, the eicosenoic acids, the docosenoic acids, for example, erucic acid, brassidic acid, cetoleic acid, the tetracosenic acids, and the like.

Examples of dienoic acids, comprise the pentadienoic acids, the hexadienoic acids, for example, sorbic acid, the octadienoic acids, for example, linoleic, and the like.

Examples of the trienoic acids comprise the octadecatrienoic acids, for example, linolenic acid, eleostearic acid, pseudo-eleostearic acid, and the like.

Examples of the cyclic aliphatic carboxylic acids comprise those found in petroleum called naphthenic acids, hydrocarbic and chaulmoogric acids, cyclopentane carboxylic acids, cyclohexanecarboxylic acid, campholic acid, fencholic acids, and the like.

Examples of aromatic monocarboxylic acids comprise benzoic acid, substituted benzoic acids, for example, the toluic acids, the xyleneic acids, alkoxy benzoic acid, phenyl benzoic acid, naphthalene carboxylic acid, and the like.

Mixed higher fatty acids derived from animal or vegetable sources, for example, lard, coconut oil, rapeseed oil, sesame oil, palm kernel oil, palm oil, olive oil, corn oil, cottonseed oil, sardine oil, tallow, soyabean oil, peanut oil, castor oil, seal oils, whale oil, shark oil, and other fish oils, teaseed oil, partially or completely hydrogenated animal and vegetable oils are advantageously employed. Fatty and similar acids include those derived from various waxes, such as beeswax, spermaceti, montan wax, Japan wax, coccerin and carnauba wax. Such acids include carnaubic acid, cerotic acid, lacceric acid, montanic acid, psyllastearic acid, etc. One may also employ higher molecular weight carboxylic acids derived by oxidation and other methods, such as from paraffin wax, petroleum and similar hydrocarbons; resinic and hydroaromatic acids, such as hexahydrobenzoic acid, hydrogenated naphthoic, hydrogenated carboxy diphenyl, naphthenic, and abietic acid, aralkyl and aromatic acids, such as Twitchell fatty acids, naphtholic acid, carboxydiphenyl pyridine carboxylic acid, blown oils, blown oil fatty acids and the like.

Other suitable acids include phenylstearic acid, etc.

Examples of the polycarboxylic acids comprise those of the aliphatic series, for example, oxalic, malonic, succinic, glutaric, adipic, pimelic, suberic, azelaic, sebacic, nonanedicarboxylic acid, decanedicarboxylic acids, undecanedicarboxylic acids, and the like.

Examples of aromatic polycarboxylic acids comprise isophthalic acids, terephthalic acids, substituted derivatives thereof (e.g. alkyl, chloro alkoxy, etc. derivatives), biphenyldicarboxylic acid, diphenylether dicarboxylic acids, diphenylsulfone dicarboxylic acids and the like.

Other polycarboxylic acids comprise the dimeric, trimeric and polymeric acids, for example, diricinoleic acid, triricinoleic acid, polyricinoleic acid, and the like. Other polycarboxylic acids comprise those containing ether groups, for example, diglycollic acid. Mixtures of the above acids can be advantageously employed.

In addition, acid precursors such as esters, acid chlorides, glycerides, etc. can be employed in place of the free acid.

Hydroxy substituted imidazolines and tetrahydropyrimidines can be obtained in the manner described above from a wide variety of polyamines containing hydroxy groups. Thus, where one starts with a polyamine, for example, a diamine of the following formula:

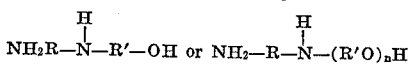

where R has for example 2 or 3 carbons in its main chain one obtains the compounds of this invention. In addition, one can start with ethylene diamine or with 1,2-propylene diamine, 1,3-propylenediamine or other polyamines and then react the cyclic amidine so obtained with alkylene oxides so as to produce a terminal hydroxy group since the nitrogen bonded hydrogen on the 1-position on the ring reacts with alkylene oxides. Polyoxyalkylated cyclic amidines can be prepared by reacting a hydroxyalkylcyclic amidine with an alkylene oxide.

Alkylene oxides comprise those of the general formula

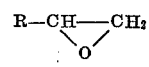

where R is an alkyl group. Among the alkylene oxides that may be employed are ethylene, propylene, butylene, octylene, etc., oxides. Other oxyalkylation agents such as glycide, epichlorohydrin, etc., can be employed.

Thus, compounds within the scope of this invention which react with polycarboxylic acids comprise compounds of the formulae:

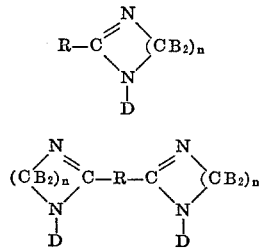

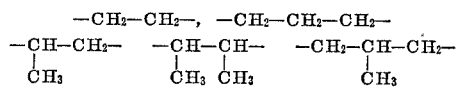

where

is the residue derived from the carboxylic acid, where R is a hydrocarbon radical having, for example, up to about 32 carbon atoms, hydrocarbons in which the carbon atom chain is interrupted by oxygen, etc., $n$ is 2 or 3; B is a hydrogen or a hydrocarbon radical, for example, an alkyl radical; and D is a hydroxy-containing radical, for example, —ROH or —$(RO)_nH$, wherein $n$ is a whole number, for example, 1–10 or higher, but preferably 1–5, and $CB_2$ is, for example, a divalent radical of the formula $$-CH_2-CH_2-, \quad -CH_2-CH_2-CH_2-$$
$$-CH-CH_2-, \quad -CH-CH-, \quad -CH_2-CH-CH_2-$$
$$\quad\ \ |\qquad\qquad\ \ |\quad\ \ |\qquad\qquad\quad\ \ |$$
$$\quad\ \ CH_3\qquad\ \ CH_3\ CH_3\qquad\qquad CH_3$$

etc.

In general, the hydroxy alkyl cyclic amidines are prepared by reacting a polyamine containing a terminal alkanol group with a carboxylic acid at temperatures of from 150–175° C. employing an azeotroping agent such as xylene to remove water. The reaction time of 3–4 hours is employed. Completion of reaction is judged by the separation of 2 moles of $H_2O$ for each carboxylic acid group.

The following Tables I, II, III, and IV illustrate the hydroxyalkyl cyclic amidines which may be used in this invention.

TABLE I

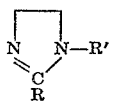

| Ex. No. | RCOOH source of RC | R' |
|---|---|---|
| 1a | Lauric | CH₂CH₂OH |
| 2a | Hexanoic | CH₂CH₂OH |
| 3a | Isovaleric | CH₂CH₂OH |
| 4a | Stearic | CH₂CH₂OH |
| 5a | Melissic | CH₂CH₂OH |
| 6a | Phenyl stearic | CH₂CH₂OH |
| 7a | Benzoic | CH₂CH₂OH |
| 8a | Creosotinic | CH₂CH₂OH |
| 9a | Naphthenic | CH₂CH₂OH |
| 10a | Oleic | CH₂CH₂OH |
| 11a | do | CH₂CH₂OCH₂CH₂OH |
| 12a | do | (CH₃)CHCH₂O—(CH₃)CHCH₂OH |
| 13a | Lauric | CH₂CH₂OCH₂CH₂OH |
| 14a | Palmitic | CH₂CH₂OCH₂CH₂OH |
| 15a | Cerotic | CH₂CH₂OCH₂CH₂OH |
| 16a | p-tert-Butyl benzoic | CH₂CH₂OCH₂CH₂OH |
| 17a | Benzoic | CH₂CH₂OCH₂CH₂OH |
| 18a | Toluic | CH₂CH₂OCH₂CH₂OH |
| 19a | Naphthenic | CH₂CH₂OCH₂CH₂OH |
| 20a | Benzoic | CH₂CH₂OCH₂CH₂OH |
| 21a | Formic | CH₂CH₂OCH₂CH₂OCH₂CH₂OH |
| 22a | Methyloctadecanoic | CH₂CH₂OCH₂CH₂OCH₂CH₂OH |
| 23a | Capric | CH₂CH₂OCH₂CH₂OCH₂CH₂OH |
| 24a | Stearic | CH₂CH₂OCH₂CH₂OCH₂CH₂OH |
| 25a | Phenylstearic | CH₂CH₂OCH₂CH₂OCH₂CH₂OH |
| 26a | Cresotinic | CH₂CH₂OCH₂CH₂OCH₂CH₂OH |
| 27a | Linoleic | CH₂CH₂OCH₂CH₂OCH₂CH₂OH |
| 28a | Oleic | CH₂CH₂OCH₂CH₂OCH₂CH₂OH |
| 29a | 3-methoxybenzoic | CH₂CH₂OCH₂CH₂OCH₂CH₂OH |
| 30a | Naphthenic | CH₂CH₂OCH₂CH₂OCH₂CH₂OH |

TABLE II

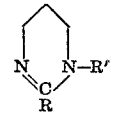

| Ex. No. | RCOOH source of RC | R' |
|---|---|---|
| 1b | Formic | CH₂CH₂OH |
| 2b | Acetic | CH₂CH₂OH |
| 3b | Butyric | CH₂CH₂OH |
| 4b | Valeric | CH₂CH₂OH |
| 5b | Isovaleric | (CH₃)CHCH₂OH |
| 6b | Trimethyl acetic | CH₂CH₂OH |
| 7b | Pelargonic | CH₂CH₂OH |
| 8b | Lauric | CH₂CH₂OCH₂CH₂OH |
| 9b | Stearic | CH₂CH₂OH |
| 10b | Arachidic | CH₂CH₂OH |
| 11b | Eucosane-carboxylic | (CH₃)CHCH₂OH |
| 12b | Cerotic | CH₂CH₂OH |
| 13b | Melissic | CH₂CH₂OH |
| 14b | Phenyl stearic | CH₂CH₂OH |
| 15b | Benzoic | CH₂CH₂OCH₂CH₂OH |
| 16b | o-Methylbenzoic acid | CH₂CH₂OH |
| 17b | Cresotinic | CH₂CH₂OH |
| 18b | p-Methylbenzoic | CH₂CH₂OH |
| 19b | p-tert-Butylbenzoic | CH₂CH₂OH |
| 20b | 3-Methoxybenzoic | CH₂CH₂OH |
| 21b | Oleic | CH₂CH₂OH |
| 22b | Undecylenic | CH₂CH₂OH |
| 23b | Linoleic | CH₂CH₂OH |
| 24b | Butyric | CH₂CH₂OH |
| 25b | Methyloctadecanoic | CH₂CH₂OH |

TABLE III

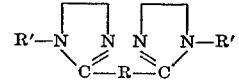

| Ex. No. | HOOC—R—COOH source of —CRC— | R' |
|---|---|---|
| 1c | Succinic | CH₂CH₂OH |
| 2c | Adipic | CH₂CH₂OH |
| 3c | Suberic | CH₂CH₂OH |
| 4c | Sebacic | CH₂CH₂OH |
| 5c | Nonodecane dicarboxylic | CH₂CH₂OH |
| 6c | Diglycolic | CH₂CH₂OH |
| 7c | Ethylene bis(glycolic) | CH₂CH₂OH |
| 8c | Methylene dibenzoic | CH₂CH₂OH |
| 9c | Stearyl malonic | CH₂CH₂OH |
| 10c | Phthalic | CH₂CH₂OH |
| 11c | Succinic | CH₂CH₂OCH₂CH₂OH |
| 12c | Glutaric | CH₂CH₂OCH₂CH₂OH |
| 13c | Pimelic | CH₂CH₂OCH₂CH₂OH |
| 14c | Azelaic | CH₂CH₂OCH₂CH₂OH |
| 15c | Eicosane dicarboxylic | CH₂CH₂OCH₂CH₂OH |
| 16c | Dilinoleic | CH₂CH₂OCH₂CH₂OH |
| 17c | Isophthalic | CH₂CH₂OCH₂CH₂OH |
| 18c | Diglycolic | CH₂CH₂OCH₂CH₂OH |
| 19c | Lauryl malonic | CH₂CH₂OCH₂CH₂OH |
| 20c | Methylene dibenzoic | CH₂CH₂OCH₂CH₂OH |
| 21c | Adipic | CH₂CH₂OCH₂CH₂OCH₂CH₂OH |
| 22c | Succinic | CH₂CH₂OCH₂CH₂OCH₂CH₂OH |
| 23c | Suberic | CH₂CH₂OCH₂CH₂OCH₂CH₂OH |
| 24c | Pimelic | CH₂CH₂OCH₂CH₂OCH₂CH₂OH |
| 25c | Nonodecane dicarboxylic | CH₂CH₂OCH₂CH₂OCH₂CH₂OH |
| 26c | Diglycolic | CH₂CH₂OCH₂CH₂OCH₂CH₂OH |
| 27c | Methylene dibenzoic | CH₂CH₂OCH₂CH₂OCH₂CH₂OH |
| 28c | Stearyl malonic | CH₂CH₂OCH₂CH₂OCH₂CH₂OH |
| 29c | Stearyl succinic | CH₂CH₂OCH₂CH₂OCH₂CH₂OH |
| 30c | Terephthalic | CH₂CH₂OCH₂CH₂OCH₂CH₂OH |

TABLE IV

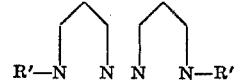

| Ex. No. | HOOC—R—COOH source of —CRC— | R' |
|---|---|---|
| 1d | Phthalic | CH₂CH₂OH |
| 2d | Succinic | CH₂CH₂OH |
| 3d | Glutaric | CH₂CH₂OH |
| 4d | Adipic | CH₂CH₂OH |
| 5d | Suberic | (CH₃)CHCH₂OH |
| 6d | Sebacic | CH₂CH₂OH |
| 7d | Pimelic | CH₂CH₂OCH₂CH₂OH |
| 8d | Azelaic | CH₂CH₂OH |
| 9d | Nonodecane dicarboxylic | CH₂CH₂OH |
| 10d | Eicosane dicarboxylic | CH₂CH₂OH |
| 11d | Diglycolic | CH₂CH₂OH |
| 12d | Ethylene bisglycolic | (CH₃)CHCH₂OH |
| 13d | Methylene dicarboxylic acid | (CH₃)CHCH₂OH |
| 14d | Dilinoleic | CH₂CH₂OH |
| 15d | Stearyl malonic | CH₂CH₂OH |
| 16d | Lauryl succinic | CH₂CH₂OH |
| 17d | Isotetradecyl succinic | CH₂CH₂OH |
| 18d | Phthalic | CH₂CH₂OCH₂CH₂OH |
| 19d | Isophthalic | CH₂CH₂OH |
| 20d | Terephthalic | CH₂CH₂OH |
| 21d | Glutaconic | CH₂CH₂OH |
| 22d | Sebacic | CH₂CH₂OH |

THE PHOSPHORIC ACID MOIETY

The desired products are obtained by reacting a hydroxy-containing amidine with a phosphorylating reagent which is a derivative of phosphoric acid. The reaction products can be described by the formula $$\text{Ⓐ}-X-\underset{\underset{XR'}{|}}{\overset{\overset{X}{\|}}{P}}-XR$$

where

X=O or S

Ⓐ is a hydroxy-containing cyclic amidine, R and R', which can be the same or different, are Ⓐ, H, alkyl (e.g. methyl, ethyl, propyl, hexyl, 2-ethyl hexyl, lauryl, etc.), cycloalkyl (e.g. cyclopentyl, cyclohexyl, etc.), aryl (phenyl, tolyl, etc.), or heterocyclic (e.g. furfuryl, etc.).

All of the X's may be oxygen or all sulfur or some of the X's may be oxygen and the others sulfur.

The simplest phosphorylating reagent which can be used is orthophosphoric acid but this requires vigorous conditions to bring about reaction. The products from this reagent are mainly monoesters, $$\text{Ⓐ}-O\overset{\overset{O}{\|}}{P}(OH)_2$$

Reagents which are generally preferred as phosphorylating reagents are anhydrides, partial anhydrides, and acid halides of phosphoric acid. These reagents require much milder conditions than orthophosphoric acid since they are highly reactive and furthermore give much better yields of the required products. The exact reagent of choice will depend on the individual hydroxy-containing imidazoline to be reacted and on the structure of the product required. For example, phosphorus pentoxide is a powerful phosphorylating reagent which on reaction with a hydroxy-containing imidazoline yields a mixture of mono- and di-esters, $$\text{Ⓐ}-O\overset{\overset{O}{\|}}{P}(OH)_2 \quad [\text{Ⓐ}O]_2-\overset{\overset{O}{\|}}{P}OH$$

The ratio of mono- to di-ester depends on the ratio of hydroxy compound to phosphorus pentoxide reacted. Part of the hydroxy containing imidazoline can be replaced by a simple aliphatic alcohol such as ethanol in which case the product will contain a more complex mixture, e.g.

$$\text{Ⓐ}-O-\underset{\underset{OH}{|}}{\overset{\overset{O}{\|}}{P}}OC_2H_5, [\text{Ⓐ}-O]_2\overset{\overset{O}{\|}}{P}OH, (C_2H_5O)_2\overset{\overset{O}{\|}}{P}OH, C_2H_5O\overset{\overset{O}{\|}}{P}(OH)_2$$

etc.

Phosphorus pentasulfide is similarly a powerful phosphorylating reagent which with hydroxy compounds gives similar products to those from phosphorus pentoxide in which some or all of the oxygens are replaced by sulfur.

Polyphosphoric acid is intermediate in behavior between orthophosphoric acid and phosphorus pentoxide since it is a partial anhydride of phosphoric acid. This reagent is particularly useful in preparing monoesters of phosphoric acid. For example, on reacting equimolar amounts of polyphosphoric and a hydroxy containing cyclic amidine the main product is a phosphate monoester, $$\text{Ⓐ}O\overset{\overset{O}{\|}}{P}(OH)_2$$

Another very important group of phosphorylating reagents which are used to prepare the products of this invention are acid halides of phosphoric acid. Among these are phosphoryl halides, $POX_3$ (X=Cl, Br), phosphorochloridates, $$(RO)_2\overset{\overset{O}{\|}}{P}Cl$$

where R is alkyl, cycloalkyl, aryl, heterocyclic), phosphorodichloridates, $$RO\overset{\overset{O}{\|}}{P}Cl_2$$

(where R is as defined above). For example, a phosphorochloridate can be reacted with a hydroxy-containing amidine to give a triester as follows:

$$\text{Ⓐ}-OH + (RO)_2\overset{\overset{O}{\|}}{P}-Cl \longrightarrow \text{Ⓐ}-O\overset{\overset{O}{\|}}{P}(OR)_2 + HCl$$

R is as defined above.

The hydrogen chloride is taken up by the cyclic amidine ring in the reaction. However, in some cases it may be desirable to add a base to remove the acid, for example a tertiary amine may be used such as pyridine, quinoline, etc., or an alkali metal oxide or carbonate such as barium carbonate, calcium carbonate or calcium oxide, etc.

Other methods for phosphorylation are known and can be found described in "Structure and Mechanism in Organo-Phosphorus Chemistry," pp. 250–280 by R. F. Hudson, Academic Press 1965, F. Cramer, in New Methods of Preparative Organic Chemistry, vol. III, pp. 319–356, Ed. W. Foerst, Academic Press 1964.

The following examples are presented for purposes of illustration and not of limitation.

EXAMPLE 1

Oleic acid (0.5 mole) was heated with hydroxyethyl ethylene diamine (0.5 mole) in xylene using a Dean & Stark tube to collect the water produced. When one mole of water (18 ml.) had been collected the xylene was removed by distillation to yield 1-β-hydroxyethyl-2-heptadecenyl-2-imidazoline. To this hydroxyethyl imidazoline (50 g.; 0.143 mole) was added polyphosphoric acid (115% ortho equivalent) (27.2 g.; 0.16 mole) with vigorous stirring. The reaction involved considerable heat. On completion of the addition the mixture was heated at 100–110° for one hour to yield a benzene-soluble product. The product is mainly the phosphate ester of the hydroxyethyl imidazoline. The formula can be represented as $$\begin{array}{c} CH_2-CH_2 \\ | \quad\quad | \\ N \quad\quad N-CH_2CH_2O-\overset{\overset{O}{\|}}{\underset{\underset{OH}{|}}{P}}OH \\ \diagdown_C\diagup \\ | \\ C_{17}H_{33} \end{array}$$

EXAMPLE 2

9-(10) phenyl stearic acid was converted to the corresponding hydroxyethyl imidazoline by reaction with hydroxyethyl ethylene diamine using the method of Example 1. Polyphosphoric acid (115% ortho equivalent) (90 g.; 0.523 mole) was added to this hydroxyethyl imidazoline (213.5 g.; 0.454 mole) and the mixture heated at 90–100° for one hour using good stirring. The product was readily soluble in aromatic hydrocarbons but insoluble in water. The product consists mainly of the phosphate ester of the hydroxyethyl imidazoline as represented by the formula $$\begin{array}{c} CH_2-CH_2 \\ | \quad\quad | \\ N \quad\quad N-CH_2CH_2O-\overset{\overset{O}{\|}}{\underset{\underset{OH}{|}}{P}}OH \\ \diagdown_C\diagup \\ | \\ (CH_2)_{7\ or\ 8} \\ | \\ CH-\!\!\!-\!\!\!\!\bigcirc \\ | \\ (CH_2)_{8\ or\ 7} \\ | \\ CH_3 \end{array}$$

EXAMPLE 3

Preparation of a hydroxyethyl imidazoline. Crofatol P (1 equivalent) was heated with hydroxyethyl ethylene diamine (1 mole) at 175–185° for four hours under reduced pressure (approximately 100 mm.) in a reaction flask fitted with a condenser for distillation. During the period of reaction, water (2 moles) distilled off and was collected, The product was mainly a 1-β-hydroxyethyl imidazoline. Crofatol P is a commercial fatty acid mixture comprised of $C_{18}$ acids including linoleic, oleic and stearic acids.

EXAMPLE 4

To the hydroxyethyl imidazoline from Example 3 (95 g.; 0.25 mole) in kerosene (150 ml.) was added polyphosphoric acid (43 g.; 0.25 mole) with vigorous stirring. The mixture was heated for two hours at 110–120° and still remained slightly heterogeneous at this time. However, on cooling to 60° and adding isopropanol (75 g.) the product became perfectly homogeneous. The product was mainly the monophosphate ester of the hydroxyethyl imidazoline as represented by the formula $$R-C\begin{array}{c}N-CH_2\\ \parallel\\ N-CH_2\\ |\\ CH_2CH_2OP-(OH)_2\\ \parallel\\ O\end{array}$$

where R is the Crofatol P fatty acid moiety.

EXAMPLE 5

This product was prepared in the same manner as Example 4 except that the mole ratio of hydroxyethyl imidazoline to polyphosphoric acid was 1.34:1 instead of 1:1. The product is represented by the formulae:

$$\begin{array}{c}CH_2-CH_2\\ |\quad\quad |\\ N\quad\quad N-CH_2CH_2OP-(OH)_2\\ \diagdown C\diagup\quad\quad\parallel\\ |\quad\quad O\\ R\end{array} + \left[\begin{array}{c}CH_2-CH_2\\ |\quad\quad |\\ N\quad\quad N-CH_2CH_2O\\ \diagdown C\diagup\\ |\\ R\end{array}\right]_2\begin{array}{c}O\\ \parallel\\ P-OH\end{array}$$

EXAMPLE 6

The hydroxyethyl imidazoline of Example 3 (95 g.; 0.25 mole) was dissolved in kerosene (120 ml.) and to the resulting solution was added diethyl phosphorochloridate (43.1 g.; 0.25 mole) during 15 mins. The reaction was mildly exothermic giving a reaction temperature of 60°. Following the addition the reaction was completed by heating at 75–85° for two hours. The product is a triester of phosphoric acid of the following formula:

$$\begin{array}{c}C_2H_5O\\ \diagdown\quad O\\ P-OCH_2CH_2-N\\ \diagup\quad\parallel\\ C_2H_5O\end{array}\begin{array}{c}CH_2-CH_2\\ |\quad\quad |\\ N\\ \diagdown C\diagup\\ |\\ R\end{array}\cdot HCl$$

EXAMPLE 7

To the hydroxyethyl imidazoline of Example 3 (151 g.; 0.4 mole) in kerosene (120 ml.) was added ethyl phosphorodichloridate (32.6 g.; 0.2 mole) during 15 minutes. The reaction was exothermic giving a temperature of 70° at the end of the addition. The reaction was completed by heating at 70–75° for 2¼ hours with stirring. The product was a triester of phosphoric acid which is represented as follows:

$$\begin{array}{c}C_2H_5O\quad\quad OCH_2CH_2-N\diagdown\quad\diagup CH_2-CH_2\\ \diagdown\diagup\quad\quad\quad\quad\quad C\\ P\quad\quad\quad\quad\quad |\quad\quad\quad\cdot HCl\\ \diagup\diagdown\quad\quad\quad\quad\quad R\\ O\quad\quad OCH_2CH_2-N\diagdown\quad\diagup CH_2-CH_2\\ \quad\quad\quad\quad\quad\quad\quad C\\ \quad\quad\quad\quad\quad\quad\quad|\quad\quad\cdot HCl\\ \quad\quad\quad\quad\quad\quad\quad R\end{array}$$

EXAMPLE 8

To the hydroxyethyl imidazoline of Example 3 (94.8 g.; 0.25 mole) dissolved in kerosene (225 mls.) was added bis (2-ethyl hexyl) phosphorochloridate (85.4 g.; 0.25 mole) dropwise during ten minutes. The addition was only very mildly exothermic and the reaction was brought to completion by heating at 70–85° for two hours. The product was a triester of phosphoric acid of the following formula:

$$\begin{array}{c}C_8H_{17}O\quad O\\ \diagdown\quad\parallel\\ P-OCH_2CH_2-N\\ \diagup\\ C_8H_{17}O\end{array}\begin{array}{c}CH_2-CH_2\\ |\quad\quad |\\ N\\ \diagdown C\diagup\\ |\\ R\end{array}\cdot HCl$$

EXAMPLE 9

Phosphorus pentoxide (17.8 g.; 0.13 mole) was added to a solution of the hydroxyethyl imidazoline of Example 3 (94.5 g.; 0.25 mole) in xylene (180 ml.). The mixture was heated with stirring at 140° (reflux) for four hours at which time all the phosphorus pentoxide had reacted. The product is a mixture of phosphoric acid esters of the following formulae:

$$(1)\ R'OP(OH)_2\quad (2)\ (R'O)_2\overset{O}{\underset{\parallel}{P}}OH\quad (3)\ (R'O)_3P$$
$$\phantom{(1)\ R'O}\underset{\parallel}{\overset{}{O}}$$

where R'=

$$-CH_2CH_2-N\begin{array}{c}CH_2-CH_2\\ \diagdown\quad\diagup\\ \quad N\\ \diagup\quad\diagdown\\ C\\ |\\ R\end{array}$$

EXAMPLE 10

This product is formed in a reaction identical with Example 9 except that ratio of phosphorus pentoxide to hydroxyethyl imidazoline is 1:3 instead of 1:2. The product is a mixture of phosphate esters of the following formulae:

$$\begin{array}{ccc}O&O&O\\ \parallel&\parallel&\parallel\\ R'OP(OH)_2&(R'O)_2POH&(R'O)_3P\end{array}$$

where R'=

$$-CH_2CH_2N\begin{array}{c}CH_2-CH_2\\ \diagdown\quad\diagup\\ \quad N\\ \diagup\quad\diagdown\\ C\\ |\\ R\end{array}$$

EXAMPLE 11

Phosphorus pentasulfide (22.2 g.; 0.1 mole) was added to a solution of the hydroxyethyl imidazoline of Example 3 (113 g. 0.3 mole) in xylene (155 ml.). The mixture was heated at 140° for two hours at which time the solid phosphorus pentasulfide had completely dissolved. Heating was continued for a further 2½ hours to complete the reaction. The product of this reaction is a mixture of thiophosphate esters which can be represented by the formulae:

$$\begin{array}{cc}S&S\\ \parallel&\parallel\\ (R'O)_2P-SHR'OP(SH)_2\end{array}$$

where R'=

$$-CH_2CH_2-N\begin{array}{c}CH_2-CH_2\\ \diagdown\quad\diagup\\ \quad N\\ \diagup\quad\diagdown\\ C\\ |\\ R\end{array}$$

EXAMPLE 12

To a solution of ethylene diamine (150 g.; 2.5 moles) in ethanol (200 ml.) warmed to 40° was added 1-tetradecyloxy 2,3-oxidopropane (135 g.; 0.5 mole) dropwise during 75 minutes. The mixture was heated at 70–80° for two hours to complete the reaction. The product obtained by evaporation of the solvent and excess ethylene diamine under vacuum. The product is mainly the substituted ethylene diamine with the following structure:

$$NH_2CH_2CH_2NH-CH_2CH-CH_2-OC_{14}H_{29}$$
$$\phantom{NH_2CH_2CH_2NH-CH_2C}|$$
$$\phantom{NH_2CH_2CH_2NH-CH_2CH-}OH$$

This substituted ethylene diamine (0.5 mole) was heated at 160–175° for one hour with Crofatol P (145 g.; 0.5 mole) in a flask fitted with still head and condenser for distillation. A vacuum of 120–140 mm. was applied and heating continued for 2½ hours at which time one mole of water had distilled off. The product was mainly a low melting imidazoline of the following structure:

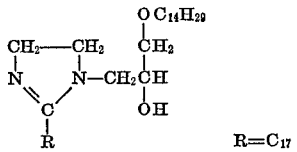

R=C$_{17}$

EXAMPLE 13

The hydroxy imidazoline of Example 12 (172 g.; 0.3 mole) was dissolved in xylene (210 mls.) and treated with phosphorus pentoxide (14.2 g.; 0.1 mole). The mixture was heated under reflux with exclusion of moisture for 3½ hours at which time the reaction was complete. The product consists of a mixture of phosphate esters derived from the imidazoline which can be represented as follows:

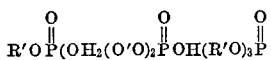

where R'

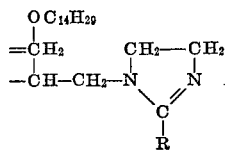

R is derived from Crofatol P.

EXAMPLE 14

Bis (2-ethyl-hexyl) phosphorochloridate (51.7 g.; 0.15 ml.) was added to a solution of the hydroxyalkyl imidazoline of Example 12 (87.3 g.; 0.15 mole) during 20 minutes. The heat of reaction raised the temperature to 45°. After the addition the mixture was heated at 90–98° for two hours to complete the reaction. The resulting product consisted mainly of the phopshoric acid triester of the following formula

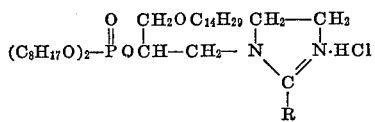

EXAMPLE 15

Following the procedure of Example 12 ethylene diamine was reacted with a commercial epoxide, Nedox 1114 (a mixture of C$_{11}$ to C$_{14}$ 1,2-epoxides) (average M.W. 189), to produce the substituted hydroxyethyl ethylene diamine of the following formula $$NH_2CH_2CH_2-NHCH_2-CH-R$$
$$\hspace{3.5cm} |$$
$$\hspace{3.5cm} OH$$

where R is C$_9$ to C$_{12}$.

This hydroxyethyl ethylene diamine was then reacted with an equimolar amount of Crofatol P to produce a hydroxyethyl imidazoline of the following formula:

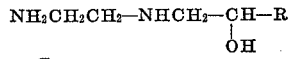

R=C$_9$ to C$_{12}$ mixture.

EXAMPLE 16

The procedure of Example 15 was followed except that Nedox 1114 was replaced by an equimolar amount of Nedox 1518 which is a mixture of C$_{15}$ to C$_{18}$ 1,2-epoxides of average molecular weight 245. The imidazoline resulting from this sequence of reactions has the following formula:

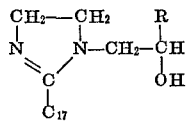

R=C$_{13}$ to C$_{16}$ mixture.

EXAMPLE 17

The hydroxy-containing imidazoline of Example 15 (0.15 mole) was heated with phosphorus pentoxide (0.05 mole) in xylene (100 ml.) following the method of Example 9. The product is similarly a mixture of phosphate esters.

EXAMPLE 18

This product is formed in a manner similar to that of Example 17 except that the imidazoline of Example 15 is replaced by the imidazoline of Example 16.

EXAMPLE 19

In the manner of Example 8 the hydroxy-containing imidazoline of Example 15 (0.1 mole) was reacted with bis(2-ethyl hexyl) phosphorochloridate (0.1 mole) in kerosene to yield a triester of phosphoric acid.

EXAMPLE 20

In this example the imidazoline of Example 15 is replaced by that of Example 16 and the method of Example 19 is followed to give a phosphate triester.

USE AS CORROSION INHIBITOR

More specifically, this phase of the invention relates to the inhibition of corrosion in the petroleum industry with specific reference to producing wells, pipe lines, refineries, tank storage, etc.

The use of a corrosion inhibiting agent in the oil industry and other industries, and particularly for the protection of ferrous metals, is well known. For example, see U.S. Pats. Nos. 2,736,658, dated Feb. 28, 1954, to Pfohl et al., and 2,756,211, dated July 24, 1956, to Jones, and 2,727,003, dated Dec. 13, 1955, to Hughes.

More specifically then, and particularly from the standpoint of oil production, this aspect of the invention relates to inhibiting corrosion caused by hydrogen sulfide, carbon dioxide, inorganic and organic acids, combinations of each with oxygen, and with each other and oxygen. More particularly, it relates to treating wells to mitigate metal corrosion and associated difficulties.

It should also be pointed out that the corrosiveness of oil well brines will vary from well to well, and the proportion of corrosion inhibiting agent added to the well fluids should also be varied from well to well. Thus, in some wells it is possible to effectively control corrosion by the addition of as little as 5 p.p.m. of my new compositions to the well fluids, whereas in other wells, it is necessary to add 200 p.p.m. or more.

In using my improved compositions for protecting oil well tubing, casing and other equipment which comes in contact with the corrosive oil-brine production, I find that excellent results may be obtained by injecting an appropriate quantity of a selected composition into a producing well so that it mingles with the oil brine mixture and comes into contact with the casing, tubing, pumps and other producing equipment. I can, for example, introduce the inhibiting composition into the top of the casing, thus causing it to flow down into the well and thence back through the tubing, etc. In general, I have found that this procedure suffices to inhibit corrosion throughout the entire system of production, and collection, even including field tankage.

In case serious emulsion or gel problems are encountered, demulsifiers are advantageously added. This is important not only to avoid the troublesome emulsions and gels themselves, but also to improve corrosion inhibition. The explanation of less effective corrosion inhibition in the presence of emulsions apparently is that the inhibitor is somewhat surface-active. That is, it is concentrated at interfacial surfaces. Since this surface is great in an emulsion, most of the inhibitor will be concentrated in these interfaces and little will remain in the body of the oil for deposition on the metal surfaces. In many wells, oil-in-water type emulsions often occur naturally. In such wells the inhibitors herein described tending to form water-in-oil emulsions, often decrease the emulsion problem naturally present. Thus, in addition to being effective corrosion inhibitors, the herein described products tend to eliminate emulsion problems which sometimes appear when some of the present day inhibitors are used in oil wells or refinery processing.

The method of carrying out my process is relatively simple in principle. The corrosion preventive reagent is dissolved in the liquid corrosive medium in small amounts and is thus kept in contact with the metal surface to be protected. Alternatively, the corrosion inhibitor may be applied first to the metal surface, either as is, or as a solution in some carrier liquid or paste. Continuous application, as in the corrosive solution, is the preferred method, however.

The present process finds particular utility in the protection of metal equipment of oil and gas wells, especially those containing or producing an acidic constituent such as $H_2S$, $CO_2$, inorganic and organic acids, $O_2$ and the like. For the protection of such wells, the reagent, either undiluted or dissolved in a suitable solvent, is fed down the annulus of the well between the casing and producing tubing where it becomes commingled with the fluid in the well and is pumped or flowed from the well with these fluids, thus contacting the inner wall of the casing, the outer and inner wall of tubing, and the inner surface of all well-head fittings, connections and flow lines handling the corrosive fluid.

Where the inhibitor composition is a liquid, it is conventionally fed into the well annulus of a motor driven chemical injector pump, or it may be dumped periodically (e.g. once every day or two) into the annulus by means of a so-called "boll weevil" device or similar arrangement. Where the inhibitor is a solid, it is dropped into the well as a solid lump or stick, blown in as a powder with gas, or washed in with a small stream of the well fluids or other liquid. Where there is gas pressure on the casing, it is necessary, of course, to employ any of these treating methods through a pressure equalizing chamber equipped to allow introduction of reagent into the chamber, equalization of pressure between chamber and casing, and travel of reagent from chamber to well casing.

Occasionally, oil and gas wells are completed in such a manner that there is no opening between the annulus and the bottom of the tubing or pump. This results, for example, when the tubing is surrounded at some point by a packing held by the casing or earth formation below the casing. In such wells the reagent may be introduced into the tubing through a pressure equalizing vessel, after stopping the flow of fluids. After being so treated, the well should be left closed in for a period of time sufficient to permit the reagent to drop to the bottom of the well.

For injection into the well annulus, the corrosion inhibitor is usually employed as a solution in a suitable solvent, such as mineral oil, methylethyl ketone, xylene, kerosene, or even water. The selection of solvent will depend much upon the exact reagent being used and its solubility characteristics. It is also generally desirable to employ a solvent which will yield a solution of low freezing point, so as to obviate the necessity of heating the solution and injection equipment during winter use.

For treating wells with packed-off tubing, the use of solid "sticks" or plugs of inhibitor is especially convenient. These are prepared by blending the inhibitor with a mineral wax, asphalt or resin in a proportion sufficient to give a moderately hard and high-melting solid which can be handled and fed into the well conveniently.

The amount of corrosion preventive agent required in my process varies with the corrosiveness of the system, but where a continuous or semicontinuous treating procedure is carried out as described above, the addition of reagent in the proportion of from 5 parts per million to 1000 parts per million or more parts of corrosive fluid will generally provide protection.

These corrosion inhibitors can be used in combination with other well-known corrosion inhibitors, for example, the cyclic amidine structures, the amido cyclic amidine structures, and the amino cyclic amidine structures, as disclosed in the Blair and Gross Reissue Pat. No. 23,227.

As pointed out previously, the addition of corrosion inhibitors, particularly in the form of a solution by means of a metering pump or the like, is common practice. The particular corrosion inhibitors herein described are applied in the same manner as other corrosion inhibitors intended for use for the same purpose. As to the use of the corrosion inhibitor, a solution of it can be prepared in a suitable solvent such as mineral oil, methyl ethyl ketone, xylene, kerosene, high boiling aromatic solvent, or even water.

The following examples are presented to illustrate the superiority of the instant compounds as corrosion inhibitors.

CORROSION TESTS

The test procedure includes measurement of the corrosive action of the fluids inhibited by the compositions herein described upon sand-blasted SAE–1020 steel coupons under conditions approximating those found in an actual producing well, and the comparison thereof with results obtained by subjecting identical test coupons to the corrosive action of the identical fluids containing no inhibitor.

In the present tests clean pint bottles are charged with 300 ml. of a synthetic brine, which contains 42 g. of sodium chloride, 1.4 g. calcium chloride, 1 g. of sodium sulfate, and 17 g. of magnesium chloride per liter, and 140 ml. of kerosene both saturated with hydrogen sulfide and a predetermined amount of inhibitor is then added. In all cases the inhibitor concentration is based on the total volume of fluid. Bottle caps holding three coupons are then placed tightly on the bottles. The bottles are then placed on a wheel contained in an oven and rotated for 4 hours at 90–95° F. Corrosion rates are then measured using the three coupons in each bottle as electrodes in conjunction with an instrument for measurement of instantaneous corrosion rates. Percent protection is calculated from $$\frac{R_1 - R_2}{R_1} \times 100\%$$

where $R_1$ is corrosion rate of uninhibited fluids
$R_2$ is corrosion rate of inhibited fluids.

Film life is then determined by replacing fluids in each bottle with 300 ml. brine and 140 ml. kerosene saturated with hydrogen sulfide as before but no inhibitor. Heating and rotation is continued in the oven at 90–95° F. and corrosion rates measured at various times. The inhibitor film on the coupons gradually is lost in this stage of the test and is followed by an increase in corrosion rate. Once the protection falls below 85% the film is considered unsatisfactory and this marks the end of film life. It can be appreciated that the longer the film life the more useful the inhibitor. The compositions of this invention give excellent protection in presence of inhibitor and particularly give long film life when subjected to the above test. The data contained in the following table clearly demonstrate the superior quality of the phosphate esters of the cyclic amidines compared with the related unphosphorylated cyclic amidines.

TABLE V

| Ex.* No. | Concentration, p.p.m. | Percent protection | Film life, hrs. | Comments |
|---|---|---|---|---|
| 3 | 100 | 98 | <4 | Hydroxy containing cyclic amidine. |
| 6 | 75 | 90 | 5 | Phosphorus derivatives of Example 3. |
| 8 | 75 | 100 | 10 | Do. |
| 10 | 75 | 99 | 15 | Do. |
| 11 | 75 | 99 | 15 | Do. |
| 13 | 75 | 98 | 15 | Do. |
| 14 | 100 | 99 | 5 | Do. |
| 15 | 60 | 99 | <4 | Hydroxy-containing cyclic amidine. |
| 17 | 60 | 99 | 15 | Phosphorus derivative of Example 15. |
| 19 | 60 | 94 | 4 | Do. |

*This indicates that the compound prepared in the example indicated was employed as the corrosion inhibitor.

OTHER USES

These products are effective not only as corrosion inhibitors but can be used for a number of other purposes. For instance, they are useful as asphalt additives to increase the adhesiveness of the asphalt to the mineral aggregates. Where they contain oxyalkylation susceptible groups, they can be subjected to extensive oxyalkylation by means of ethylene oxide, propylene oxide, butylene oxide, octylene oxide, etc. These are oxyalkylated and still have oil solubility as, for example, by the addition of propylene oxide or butylene oxide, or are oxyalkylated to produce water solubility as, for example, by means of ethylene oxide or glycide. They are also oxyalkylated by combinations of propylene oxide and ethylene oxide so that both water solubility and oil solubility remain. Such products are useful for a variety of purposes and particularly for those where nonionic surfactants or sequestered cationic surfactants are indicated.

In addition, the present compounds, or the oxyalkylated derivatives thereof and salts of either have the following applications:

As demulsifiers and desalters for water-in-oil emulsions; as demulsifiers for oil-in-water emulsions; as fuel oil additives for gasoline, diesel fuel, jet fuel, and the like; as lubricating oil additives; as scale preventatives; as chelating agents or to form chelates which are themselves useful, for example, as anti-oxidants, fungicides etc.; as flotation agents, for example, as flotation collection agents; as additives for compositions useful in acidizing calcareous strata of oil wells; as additives for treating water used in the secondary recovery of oil and in disposal wells; as additives used in treating oil-well strata in primary oil recovery to enhance the flow of oil; as emulsifiers for both oil-in-water and water-in-oil emulsions; as additives for slushing oils; as additives for cutting oils; as additives for oil to prevent emulsification during transport; as additives for drilling muds; as agents useful in removing mud sheaths from newly drilled wells; as dehazing or "fog-inhibiting" agents for fuels; as additives for preparing sand or mineral slurries useful in treating oil wells to enhance the recovery of oil; as agents for producing polymeric emulsions useful in preparing water-vapor impermeable paper board; as agents in paraffin solvents; as agents in preparing thickened silica aerogel lubricants; as gasoline anti-oxidant additives; as deicing agents for fuels; as antiseptic, preservative, bactericidal, bacteriostatic, germicidal, fungicidal agents; as agents for the textile industry, for example, as mercerizing assistants, as wetting agents, as rewetting agents, as dispersing agents, as detergents, as penetrating agents, as softening agents, as dyeing assistants, as anti-static agents, and the like; as additives for rubber latices; as an entraining agent for concrete and cements; as anti-static agents for rugs, floors, upholstery, plastic and wax polishes, textiles, etc.; as detergents useful in metal cleaners, in floor oils, in dry cleaning, in general cleaning, and the like; as agents useful in leather processes such as in flat liquoring, pickling, acid degreasing, dye fixing, and the like; as agents in metal pickling, as additives in paints for improved adhesion of primers, in preventing water-spotting in lacquer; as anti-skinners for pigment flushing, grinding and dispersing; as antifeathering agents in ink; as agents in the preparation of wood pulp and pulp slurries; as emulsifiers for insecticidal compositions and agricultural sprays such as DDT, 24-D (Toxaphene), chlordan, nicotine sulfate, hexachlorocyclohexane, and the like; as agents useful in building materials, for example, in the water repellent treatment of plaster, concrete, cement, roofing materials, floor sealers; as additive in bonding agents for various insulating building materials; and the like.

I claim:

1. A process of inhibiting corrosion of ferrous metals and alloys in producing wells, pipe lines, refineries, storage tanks and equipment related thereto comprising contacting said metals and alloys with cyclic amidine esters of phosphoric acids, or mixtures thereof, or hydrohalide salts of said cyclic amidine esters of phosphoric acids, or mixtures thereof, said cyclic amidine esters of phosphoric acids being of the formula

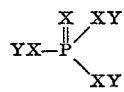

wherein
X is oxygen,
Y is hydrogen, alkyl of 1 to 12 carbon atoms, cyclopentyl, cyclohexyl, phenyl, tolyl, furfuryl or a cyclic amidine of the formula

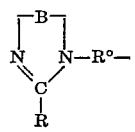

wherein B is a member selected from the group consisting of

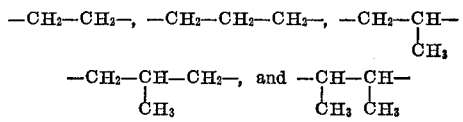

R is hydrogen, saturated aliphatic hydrocarbon of 1 to 31 carbon atoms, unsaturated aliphatic hydrocarbon, without any acetylenic unsaturation, of 2 to 31 carbon atoms, cycloaliphatic hydrocarbon of 6 to 31 carbon atoms,

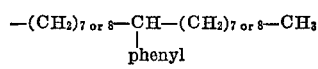

or mixtures thereof

R° is

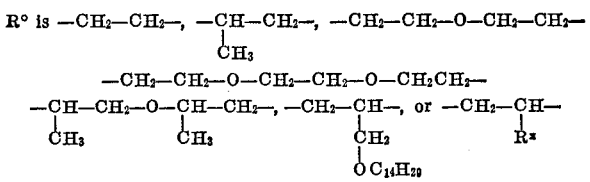

where
$R^x$ is a member selected from the group consisting of a mixture of $C_9H_{19}$, $C_{10}H_{21}$, $C_{11}H_{23}$ and $C_{12}H_{25}$ and a mixture of $C_{13}H_{27}$, $C_{14}H_{29}$, $C_{15}H_{31}$ and $C_{16}H_{33}$,
with the proviso that at least one of the Ys is one of the foregoing cyclic amidine members.

2. The process of claim 1 wherein Y is

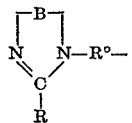

3. The process of claim 2 wherein Y is

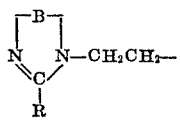

4. The process of claim 3 wherein Y is

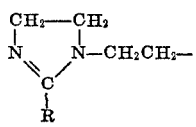

5. The process of claim 4 wherein said metals and alloys are contacted with hydrohalide salts of the formula

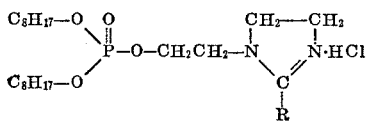

R being a mixture of $CH_3(CH_2)_3(CH_2CH=CH)_2(CH_2)_7$, $CH_3(CH_2)_7CH=CH(CH_2)_7$ and $CH_3(CH_2)_{16}$.

References Cited
UNITED STATES PATENTS

| | | | |
|---|---|---|---|
| 2,927,080 | 3/1960 | Westlund et al. | 252—389 X |
| 2,468,163 | 1/1948 | Blair et al. | 252—8.55 E |
| 2,891,909 | 6/1959 | Hughes | 252—8.55 |
| 3,014,864 | 12/1961 | Hughes et al. | 252—8.55 |
| 3,585,210 | 6/1971 | Redmore | 260—309.6 |

HERBERT B. GUYNN, Primary Examiner

U.S. Cl. X.R.

8—94.1 P, 125; 106—14, 281 N; 252—344, 389, 400, 542; 260—251 P, 309.6; 424—200